(12) United States Patent
Bosma et al.

(10) Patent No.: US 7,448,344 B2
(45) Date of Patent: Nov. 11, 2008

(54) MILKING DEVICE AND A METHOD OF HANDLING A MILKING DEVICE

(75) Inventors: Epke Bosma, Hölö (SE); Nils Erik Holmertz, Huddinge (SE); Lars Wase, Danderyd (SE)

(73) Assignee: DeLaval Holding AB, Tumba (SE)

( * ) Notice: Subject to any disclaimer, the term of this patent is extended or adjusted under 35 U.S.C. 154(b) by 405 days.

(21) Appl. No.: 10/563,140

(22) PCT Filed: Jun. 16, 2004

(86) PCT No.: PCT/SE2004/000971

§ 371 (c)(1),
(2), (4) Date: Dec. 30, 2005

(87) PCT Pub. No.: WO2005/000011

PCT Pub. Date: Jan. 6, 2005

(65) Prior Publication Data

US 2006/0156990 A1     Jul. 20, 2006

(30) Foreign Application Priority Data

Jun. 30, 2003    (SE) .................................... 0301934

(51) Int. Cl.
*A01J 1/00*        (2006.01)
(52) U.S. Cl. .................................................. 119/14.08
(58) Field of Classification Search ........................ None
See application file for complete search history.

(56) References Cited

U.S. PATENT DOCUMENTS

| | | | | |
|---|---|---|---|---|
| 4,572,105 A | * | 2/1986 | Chowdhury et al. | 119/14.18 |
| 5,085,172 A | * | 2/1992 | Borgman et al. | 119/14.09 |
| 5,275,124 A | * | 1/1994 | van der Lely et al. | 119/14.08 |
| 5,673,650 A | * | 10/1997 | Mottram et al. | 119/651 |
| 5,862,776 A | * | 1/1999 | van den Berg | 119/14.1 |
| 5,881,669 A | * | 3/1999 | van den Berg et al. | 119/14.03 |
| 6,079,359 A | * | 6/2000 | van den Berg | 119/14.01 |
| 6,234,110 B1 | * | 5/2001 | Xavier | 119/14.47 |
| 6,321,682 B1 | * | 11/2001 | Eriksson et al. | 119/14.44 |
| 6,561,126 B2 | | 5/2003 | Forsen et al. | |
| 6,584,930 B2 | * | 7/2003 | Buecker | 119/14.02 |
| 6,619,227 B1 | * | 9/2003 | Berger et al. | 119/14.08 |

(Continued)

FOREIGN PATENT DOCUMENTS

SE        515 443 C3    8/2001

(Continued)

*Primary Examiner*—Thomas Price
(74) *Attorney, Agent, or Firm*—Hovey Williams LLP

(57) ABSTRACT

The invention refers to a milking device and a method of handling a milking device. The milking device includes a milk-transporting member (1) having at least one teatcup (2) and arranged to transport milk from a teat of an animal to a milk-collecting member (4) during a milking state. A low pressure is connected to the milk-transporting member (1) for sucking the milk from the teat to the milk collecting member. A gas conduit (11) permits the introduction of a gas into the milk-transporting member. The gas conduit has a first end (12), which is a gas inlet member (15). The gas conduit has a second end connectable to a relatively low pressure for permitting a flow of a cleaning fluid from the milk-transporting member through the gas conduit during a cleaning state.

20 Claims, 2 Drawing Sheets

U.S. PATENT DOCUMENTS

| | | | |
|---|---|---|---|
| 6,634,317 B1 * | 10/2003 | Forster | 119/72 |
| 6,644,240 B1 * | 11/2003 | Dietrich | 119/14.47 |
| 6,725,803 B2 * | 4/2004 | Van der Lingen et al. | 119/14.02 |
| 6,752,102 B2 * | 6/2004 | Dahl et al. | 119/14.47 |
| 6,957,625 B2 * | 10/2005 | Hennig | 119/14.02 |
| 7,036,981 B2 * | 5/2006 | Veenstra et al. | 374/142 |
| 7,128,020 B2 * | 10/2006 | Bjork et al. | 119/14.18 |
| 7,143,718 B2 * | 12/2006 | Bosma et al. | 119/14.02 |
| 7,162,971 B2 * | 1/2007 | Johannesson et al. | 119/14.18 |
| 7,178,480 B2 * | 2/2007 | Dahl et al. | 119/14.47 |
| 7,198,003 B2 * | 4/2007 | Bosma et al. | 119/14.18 |
| 7,263,948 B2 * | 9/2007 | Ericsson et al. | 119/14.18 |
| 7,270,079 B2 * | 9/2007 | Johannesson et al. | 119/14.18 |

FOREIGN PATENT DOCUMENTS

| | | |
|---|---|---|
| WO | WO 96/17509 | 6/1996 |
| WO | WO 98/28969 | 7/1998 |
| WO | WO 01/19176 A1 | 3/2001 |

* cited by examiner

US 7,448,344 B2

MILKING DEVICE AND A METHOD OF HANDLING A MILKING DEVICE

Applicant hereby incorporates by reference International Application PCT/SE2004/000971, filed 16 Jun. 2004, claiming priority from Swedish Application No. 0301934-6 filed 30 Jun. 2003 (also incorporated by reference herein).

THE BACKGROUND OF THE INVENTION AND PRIOR ART

The present invention refers to a milking device operable in a milking state and a cleaning state, the device including: a milk-transporting member, which includes at least one teatcup to be attached to a teat of an animal to be milked and is arranged to permit the transporting of milk from the teat to a milk-collecting member during the milking state, wherein the milk-transporting member is connectable to a relatively low pressure for achieving said transporting by sucking milk from the teat to the milk-collecting member via the milk-transporting member during the milking state; and a gas conduit for the introduction of a gas into the milk-transporting member during the milking state in order to enhance said transporting of milk, wherein the gas conduit has a first end which is connected to the milk-transporting member and includes a gas inlet member for the introduction of said gas into the gas conduit. Such a device is disclosed in WO98/28969.

The invention also refers to a method of handling a milking device, including at least one milk-transporting member including at least one teatcup, during a milking state and a cleaning state, the method including the steps of:

attaching the teatcup of the milk-transporting member to a teat of an animal to be milked, transporting milk during the milking state from the teat to a milk-collecting member by sucking milk to the milk-collecting member via the teatcup and the milk-transporting member by applying a relatively low pressure to the milk-transporting member; and supplying a gas into the milk-transporting member via a gas conduit in order to permit said transporting of milk, wherein the gas conduit has a first end which is connected to the milk-transporting member and includes a gas inlet member for the introduction of said gas into the gas conduit.

It is known to provide such a gas inlet member in a milking device, conventionally in the proximity of the teatcup or in a claw. The purpose of such a gas inlet is to create a flow of a gas, such as air, through the inner space of the milk-transporting member in order to enable the transport of the milk, and to provide a uniform and efficient flow of milk. It is also important to mix as little air as possible in the milk in order to be able to maintain a high quality of the milk. Consequently, the opening is to have a small flow area. However, such gas inlets have the drawback that they often become filled up with dirt, dust, milk residuals, flies, etc.

WO98/28969 discloses a milking plant including two conduits for the supply of air to the milk-transporting member. One of these conduits ends in an upper part of the teatcup, and the other of these conduit ends immediately beneath the teatcup in a milk conduit. These two conduits are also connectable to a source of a cleaning liquid permitting the cleaning liquid to be transported through the conduits into the teatcup and the milk conduit, respectively.

WO96/17509 discloses a milking device including teatcups, milk lines connected thereto and means for transporting the milk from the teatcups through the milk lines. Air suction lines are connected to and debouche into a respective one of the teatcups or the milk lines via a small aperture. A problem of such a milking device is that the aperture may get clogged by milk flowing through the teatcup and the milk line.

WO01/19176 discloses another milking device including a teatcup, a milk suction hose connected to the teatcup and means for transporting the milk from the teatcup through the milk suction hose. An aperture is provided on a connector means between the teatcup and the milk suction hose and provides a passage for air from the surrounding to the interior of the milk suction hose. Moreover, a cleaning device is provided for cleaning the aperture and ensure the open flow area of the aperture. WO01/19176 proposes a plurality of different embodiments of the cleaning device, for example an external nozzle for jetting a fluid onto the aperture, an external nozzle for applying a suction effect to the region of the aperture, or a conduit arranged within the pulse hose for supplying a pressurised fluid to the aperture.

SUMMARY OF THE INVENTION

The object of the present invention is to overcome the problems mentioned above and to provide a secure and reliable gas supply to the milk-transporting member of a milking device. A further object is to provide an efficient and convenient cleaning of the gas supplying means.

These and other object are achieved by the milking device initially defined, which is characterised in that the gas conduit, beyond the gas inlet member, has a second end which is connectable to a relatively low pressure for permitting a flow of a cleaning fluid from the milk-transporting member through the gas conduit during the cleaning state.

By such an arrangement, a gas such as air may be supplied in a uniform flow during the milking state, i.e. during the milking of the animal, through the gas conduit forming a substantially closed passage for the gas from the gas inlet member to the milk-transporting member. Such a gas supply ensures and enhances the transport of milk from the teat to the milk-collecting member. Moreover, by means of the relatively low pressure, the cleaning fluid may be sucked through the gas conduit in an efficient and convenient manner during the cleaning state, so that said gas supply to the milk-transporting member during the milking state may be secured. Dirt and other particles, milk residuals, micro-organisms, etc. may thus be efficiently removed from the gas conduit, especially in the proximity of the first end forming a gas outlet into the milk-transporting member. Furthermore, the cleaning of the gas conduit may take place together with the cleaning of the teatcup, the milk-transporting member and further parts of the milking device, for instance as a part of the regular cleaning operation. No external jetting or spraying of any fluids is necessary for cleaning the gas conduit. The supply of the cleaning fluid may be performed within a closed system of components. The cleaning fluid is supplied through the gas conduit during the cleaning state when no milking takes place. In such a way, it may be ensured that the gas outlet mentioned above is clean and fully opened when every milking operation is initiated, and that no cleaning fluid will reach the milk and the milk-collecting member. The cleaning may be controlled to be performed according to a predetermined scheme, for instance between substantially every milking, every second milking, etc.

According to an embodiment of the present invention, the gas inlet member includes an opening, which communicates with a relatively high pressure that is higher than said relatively low pressure. In such a way, a flow of the gas through the gas conduit to the milk-transporting member is ensured.

Advantageously, said high pressure may be formed by the surrounding environment, wherein the gas is air and wherein the high pressure may correspond to the atmospheric pressure.

According to a further embodiment of the present invention, the gas inlet member is provided at a distance from the first end and from the milk-transporting member. By arranging the gas inlet member at a significant distance from the milk-transporting member and the teatcup, the gas inlet member may easily be protected from dirt, dust, micro-organisms etc. present in the environment surrounding the teatcup. For instance, the gas inlet member may include a conduit extending to a position outside the milking stall building.

According to a further embodiment of the present invention, the relatively low pressure to the milk-transporting member and the relatively low pressure to the gas conduit are provided by at least one vacuum pump. The vacuum pump may constitute the main vacuum source of the milking device and may thus be connected to the milk-collecting member via a vacuum conduit.

According to a further embodiment of the present invention, the device includes a cleaning device arranged to deliver the cleaning fluid to the teatcup for permitting said flow through the gas conduit during the cleaning state. Furthermore, the cleaning device may be arranged to deliver the cleaning fluid to the teatcup for permitting said flow to the milk-collecting member. The cleaning fluid is thus collected in the milk-collecting member during the cleaning state, and may be transported therefrom by means of a pump or any other similar means be transported therefrom to an effluent outlet or be re-circulated. Still further, the cleaning device may be arranged to deliver the cleaning fluid to the teatcup for permitting said flow through the milk-transporting member. The cleaning fluid is thus transported simultaneously and in two substantially parallel flows through the milk-transporting member and the gas conduit for simultaneous cleaning of these conduits.

According to a further embodiment of the present invention, the cleaning device includes a cleaning nozzle to be introduced into the teatcup, and a supply unit for supplying the cleaning fluid to the cleaning nozzle for said delivery of the cleaning fluid. Such a cleaning nozzle and supply unit, which may form parts of a regular cleaning equipment for cleaning of the teatcup, the milk-transporting member and the milking member, may thus in a convenient manner also be used for the cleaning of the gas conduit.

According to a further embodiment of the present invention, the gas conduit includes a valve arranged between the gas inlet member and the second end, wherein the valve is adapted to be closed during the milking state and to be open during at least a part of the cleaning state. By means of such a valve, and possibly a suitable control unit connected to the valve, the cleaning of the gas conduit can be controlled to take place as a part of the regular cleaning operation.

According to a further embodiment of the invention, the first end of the gas conduit is connected to the teatcup. The gas flow may thus be permitted directly into the inner space of the teatcup. Furthermore, the milk-transporting member may also include at least one milk hose, wherein the first end of the gas conduit may connected to the milk hose for permitting said gas flow into the interior of the milk hose.

According to another embodiment of the present invention, the milk-transporting member also includes a claw, wherein the first end of the gas conduit may be connected to the claw for permitting the gas flow into the interior of the claw.

The object is also achieved by the method initially defined, which is characterised by the further step of permitting a flow of a cleaning fluid from the milk-transporting member through the gas conduit during the cleaning state by applying a relatively low pressure to the gas conduit at a second end of the gas conduit beyond the gas inlet member.

Advantageous embodiments of the method are defined in claims 16 to 22.

BRIEF DESCRIPTION OF THE DRAWINGS

The present invention is now to be explained more closely by means of the description of various embodiments and with reference to the drawings attached hereto.

DETAILED DESCRIPTION OF VARIOUS EMBODIMENTS OF THE INVENTION

Figure 1:
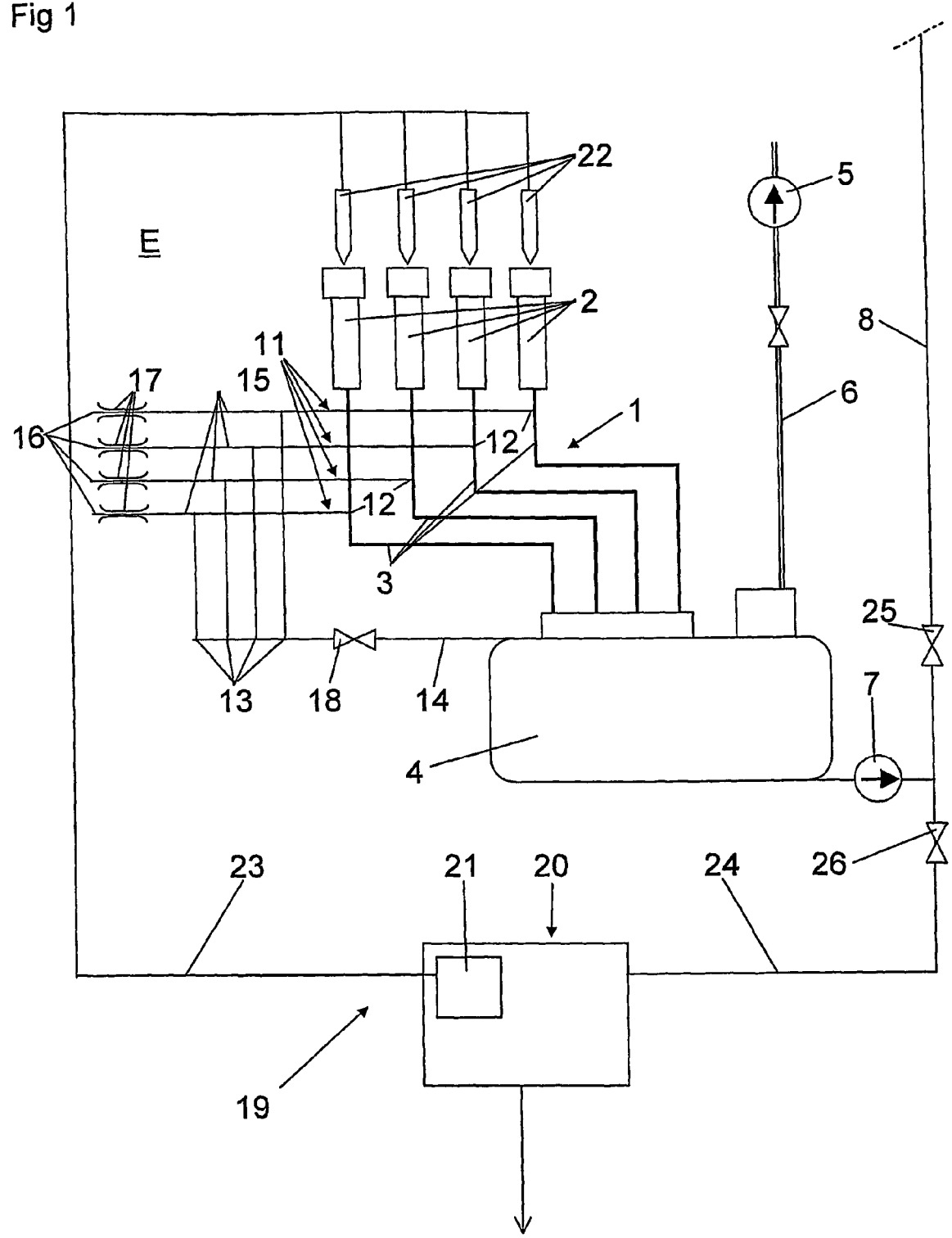
FIG. 1 discloses schematically a milking device according to a first embodiment of the present invention.
Figure 2:
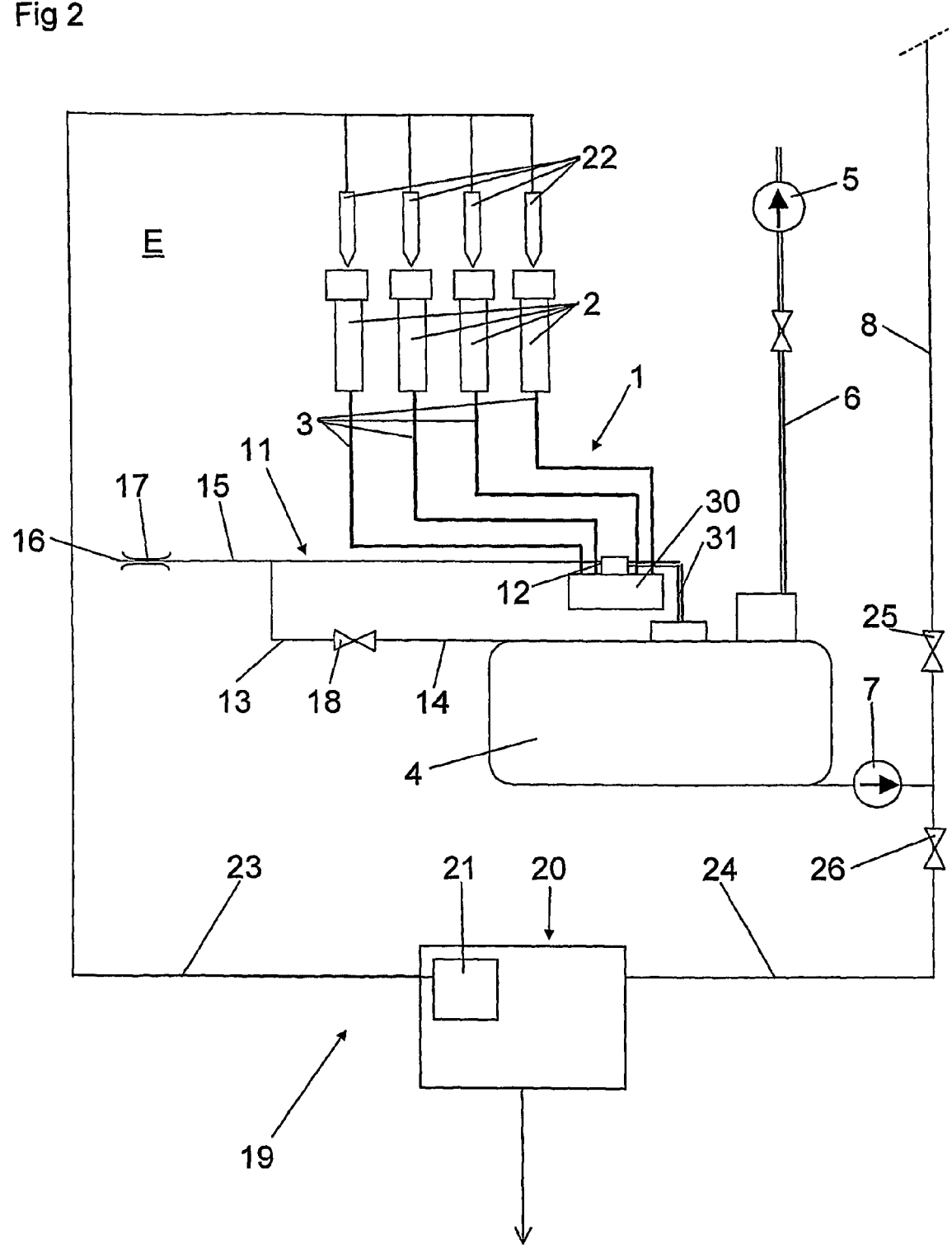
FIG. 2 discloses schematically a milking device according to a second embodiment of the present invention.

FIGS. 1 and 2 disclose a milking device for milking an animal such as cows. The invention is not limited to milking of cows but may also be applied to milking of other animals such as goats, cheep, horses, buffaloes etc. The milking device is operable in a milking state, during which the animal is milked, and a non-milking, cleaning state, during which the device is cleaned and not attached to an animal.

The milking device according to the first embodiment disclosed in FIG. 1 includes milk-transporting member 1, including four teatcups 2 and four milk hose 3, wherein each teatcup 2 is arranged at an end of a respective one of the milk hoses 3. Each teatcup 2 is adapted to be attached to a teat of the animal (not shown) to be milked. Each teatcup 2 may be of a conventional type with an inner space for receiving the teat, and a pulsation chamber for cyclically pulsating the wall defining the inner space. The milk-transporting member 1 is via the milk hoses 3 connected to a milk-collecting member 4 and thus arranged to permit the transporting of milk from the teat to the milk-collecting member 4 during the milking state.

A pump device, in the following a vacuum pump 5, is also connected to the milk-transporting member 1 via the milk-collecting member 4 and a vacuum conduit 6. The vacuum pump 5 is arranged to produce a relatively low pressure in the milk-collecting member 4 and the milk-transporting member 1. Consequently, the milk is transported in a conventional manner by being sucked from the teats to the milk-collecting member 4 via the teatcups 2 and the milk hoses 3. From the milk-collecting member 4 the milk may then be conveyed in a conventional manner by means of a milk pump 7 to a milk tank (not shown) or any other suitable storing means via a milk line 8.

In order to obtain a uniform and proper flow of milk in the milk-transporting member 1 from the teatcups 2 to the milk-collecting member 4, a respective gas conduit 11 is connected to each of the milk hoses 3 of the milk-transporting member 1. Each gas conduit 11 permits the introduction of gas into the milk-transporting member 1 in order to enhance the flow of milk to be transported therein. Each gas conduit 11 has a first end 12, which is connected to the milk-transporting member 1 and forms a gas outlet for the gas from the gas conduit 11 to the milk-transporting member 1. Furthermore, the gas conduit 11 has a second end 13, which via a common connection conduit 14 is connected to the milk-collecting member 4. At an intermediate position, i.e. between the first end 12 and the second end 13, each gas conduit 11 includes a respective gas inlet member 15. The gas inlet member 15 may have various designs. In the most simple form, the gas inlet member 15 may be formed by a small aperture 16 or hole in the gas conduit 11. In the embodiments disclosed in FIGS. 1 and 2, the gas inlet member 15 includes a short inlet conduit, which communicates with the gas conduit 11 at one end and which includes a small aperture 16 or hole at the other opposite end. Furthermore, in the embodiments disclosed the short inlet conduit at the aperture 16 is provided with a schematically indicated throttling 17, which is adapted to provide an inlet aperture 16 of a determined size. In the embodiments disclosed the aperture 16 communicates with the atmosphere of the surrounding environment E, which provides an atmospheric pressure, which is significantly higher than the pressure provided in the milk-collecting member 4 by means of the vacuum pump 5. Consequently, during the milking state, air will be sucked from the surrounding atmosphere through the apertures of the gas inlet members 15 into the milk-transporting member 1 to improve the milk flow from the teatcups 2 to the milk-collecting member 4. The aperture 16 may according to a further embodiment be positioned outside the milking stall building and/or be provided with a filter for filtering the gas to be sucked into the gas conduit 11 and the milk-transporting member 1.

In the embodiment disclosed in FIG. 1, the gas conduit 11 is connected to the milk hose 3 of the milk-transporting member 1 for permitting a gas flow into the interior of the milk hose 3. It is to be noted, however, that the gas conduit 11 also may be connected to the teatcup 2 of the milk-transporting member 1 for permitting gas flow directly into the inner space of the teatcup 2.

A valve 18 is provided on the connection conduit 14. During the milking state, the valve 18 is closed to ensure that the air from the surrounding atmosphere is conveyed via the gas conduits 11 into the milk-transporting member 1 in the proximity of the teatcups 2.

It is to be noted, that the gas inlet members 15 also may include forcing means, such as a compressor, for forcing a gas such as air into the gas conduits 11 and the milk-transporting member 1. In such a case, a pressure higher than the surrounding atmospheric pressure may be obtained for improving the flow of milk in the milk-transporting member 1.

The milking device also includes or co-operates with a cleaning device 19. The cleaning device 19 is arranged to clean the gas conduits 11, the milk-transporting member 1, the milk-collecting member 4 and the pump 7. The cleaning device 19 includes a central cleaning equipment 20 having a supply unit 21 for providing a fresh cleaning fluid, preferably a cleaning liquid. FIGS. 1 and 2 disclose a so called re-circulating cleaning arrangement, wherein the central cleaning equipment 20 is arranged to re-circulate the cleaning fluid in a manner known per se.

The cleaning device 19 also includes four cleaning nozzles 22 and four cleaning fluid conduits 23. The supply unit 21 is connected to the cleaning nozzles 22 via the conduits 23. During a cleaning operation for cleaning the teatcups 2, the milk-transporting member 1, the milk-collecting member 4 and the pump 7, the cleaning fluid is thus supplied from the supply unit 21 via the cleaning fluid conduit 23 to each of the cleaning nozzles 22. The nozzles are introduced into the respective teatcup 2 in a manner known per se. The cleaning fluid is thus introduced into the interior of the respective teatcup 2, and thus sucked by means of the relatively low pressure produced by the vacuum pump 5 through the respective milk-transporting member 1 into the milk-collecting member 4. Thus, these components, i.e. the teatcups 2, the milk-transporting member 1, the milk-collecting member 4 and the pump 7 are properly cleaned. The cleaning fluid is then pumped by means of the milk pump 7 via a return conduit 24 of the cleaning device 19 back to the central cleaning equipment 20. As appears from FIG. 1, the milk line 8 includes a valve 25, which is open during the milking state and closed during the cleaning state and the cleaning operation described above. Furthermore, the return conduit 24 includes a valve 26, which is closed during the milking state and open during the cleaning state and the cleaning operation.

During the cleaning operation, the gas conduits 11 may thus also be cleaned. For obtaining such cleaning the valve 18 is opened. When the valve 18 is open, the cleaning state is initiated, during which the cleaning fluid will be sucked from the teatcups 2 and the milk-transporting member 1 not only directly to the milk-collecting member 4 via the milk-transporting member 1, but also via the gas conduits 11. In such a way an efficient cleaning of the gas conduits 11, and in particular the area of the gas conduits 1 in the proximity of the second ends 12 at the outlets to the milk-transporting member 1 may be cleaned in an efficient manner. The flow of the cleaning fluid through the gas conduits 1 are enhanced and made more uniform thanks to the provision of the gas inlet members 15 and the apertures 16 permitting a certain introduction of gas, such as air. The cleaning fluid flowing through the gas conduits 11 is thus also fed to the milk-collecting member 4 and further transported back to the central cleaning equipment 20 by means of a pump 7 via the return conduit 24. The cleaning of the gas conduits 11 may thus be performed as an integrated part of the cleaning operation regarding the teatcups 2, the milk-transporting member 1 and the milk-collecting member 4. Preferably, the valve 18 is not open, and the cleaning state initiated, until a certain time period after the cleaning operation has started so that dirt and particles in the teatcups 2 will not be sucked into and clog the gas conduits 11 during the cleaning operation.

The second embodiment disclosed in FIG. 2 differs from the first embodiment in that the milk-transporting member 1 includes a claw 30 and a milk conduit 31. Each teatcup 2 and thus each milk hose 3 are connected to the claw 30, which via the milk conduit 31 is connected to the milk-collecting member 4. The milk from the teats of the animal is thus first collected in the claw 3 in a manner known per se, and then transported to the milk-collecting member 4 via the milk conduit 31. In this embodiment, only one gas conduit 11 is necessary, which preferably is connected to the claw 30 for permitting the gas flow to the inner space of the claw 30. The gas outlet to the inner space of the claw 30 is preferably arranged at an upper part of the claw, with regard to a normal milking position. When being cleaned the claw 30 is turned upside down to ensure that the cleaning fluid will be sucked from the interior of the claw 30 through the gas conduit 11. Consequently, in the same way as in the first embodiment a reliable cleaning of the gas conduit 11 during the cleaning state may be achieved.

The present invention is not limited to the embodiments disclosed but may be varied and modified within the scope of the following claims.

It is to be noted, that the cleaning fluid according to another embodiment may be sucked through the gas conduits 11 by means of a relatively low pressure, deviating from the low pressure produced by the vacuum pump 5, and achieved, for instance, by means of a separate low pressure source.

It is also to be noted that the present invention is also applicable to a cleaning arrangement, wherein the used cleaning fluid leaving the pump 7 is not re-circulated but fed to an effluent outlet.

The milking device as described herein is applicable to milking in an automatic system with automatic attachment of the teatcups to the teat of the animal to be milked by means of a milking robot or the like, or in a manual system with manual attachment of the teatcups to the teats of the animal.

The invention claimed is:

1. A milking device operable in a milking state and a cleaning state, the device including:
   a milk-transporting member which includes at least one teatcup to be attached to a teat of an animal to be milked and is arranged to permit the transporting of milk from the teat to a milk-collecting member during the milking state, wherein the milk-transporting member is connectable to a relatively low pressure for achieving said transporting by sucking milk from the teat to the milk-collecting member via the milk-transporting member during the milking state; and
   a gas conduit for the introduction of a gas into the milk-transporting member during the milking state in order to enhance said transporting of milk, wherein the gas conduit has a first end connected to the milk transporting member and includes a gas inlet member for the introduction of said gas into the gas conduit,
   wherein the gas conduit beyond the gas inlet member has a second end which is connectable to a relatively low pressure for permitting a flow of a cleaning fluid from the milk-transporting member through the gas conduit during the cleaning state, and
   wherein the device includes a cleaning device arranged to deliver the cleaning fluid to the teatcup for permitting said flow through the gas conduit during the cleaning state, said cleaning device including a cleaning nozzle to be introduced into the teatcup, and a supply unit for supplying the cleaning fluid to the cleaning nozzle for said delivery of the cleaning fluid.

2. A milking device according to claim 1, wherein the gas inlet member includes an opening which communicates with a relatively high pressure that is higher than said relatively low pressure.

3. A milking device according to claim 2, wherein said relatively high pressure is formed by the surrounding environment.

4. A milking device according to claim 1, wherein the gas inlet member is provided at a distance from the first end and the milk-transporting member.

5. A milking device according to claim 1, wherein the relatively low pressure to the milk-transporting member and the relatively low pressure to the gas conduit are provided by at least one vacuum pump.

6. A milking device according to claim 5, wherein the vacuum pump is connected to the milk-collecting member via a vacuum conduit.

7. A milking device according to claim 1, wherein the cleaning device is arranged to deliver the cleaning fluid to the teatcup for permitting said flow to the milk-collecting member.

8. A milking device according to claim 7, wherein the cleaning device is arranged to deliver the cleaning fluid to the teatcup for permitting said flow through the milk-transporting member.

9. A milking device according to claim 1, wherein the gas conduit includes a valve arranged between the gas inlet member and the second end, wherein the valve is adapted to be closed during the milking state and to be open during at least a part of the cleaning state.

10. A milking device according to claim 1, wherein the first end of the gas conduit is connected to the teatcup.

11. A milking device according to claim 1, wherein the milk-transporting member also includes at least one milk hose, wherein the first end of the gas conduit is connected to the milk hose.

12. A milking device according to claim 1, wherein the milk-transporting member also includes a claw, wherein the first end of the gas conduit is connected to the claw.

13. A method of handling a milking device, the milking device including at least one milk-transporting member including at least one teatcup, during a milking state and a cleaning state, the method including the steps of:
   attaching the teatcup of the milk-transporting member to a teat of an animal to be milked;
   transporting milk during the during the milking state from the teat to a milk-collecting member by sucking milk to the milk-collecting member via the teatcup and the milk-transporting member by applying a relatively low pressure to the milk-transporting member; and
   supplying a gas into the milk-transporting member via a gas conduit in order to permit said transporting of milk, wherein the gas conduit has a first end which is connected to the milk-transporting member and a second end and further includes a gas inlet member for the introduction of said gas into the gas conduit positioned between the first end and the second end;
   and including the further step of supplying a cleaning fluid from the milk-transporting member through the gas conduit during the cleaning state by applying a relatively low pressure to the gas conduit at the second end of the gas conduit beyond the gas inlet member.

14. A method according to claim 13, including the further step of communicating the gas inlet member via an opening with a relatively high pressure that is higher than said relatively low pressure.

15. A method according to claim 14, wherein said high pressure is formed by the surrounding environment.

16. A method according to claim 13, including the further step of delivering the cleaning fluid by means of a cleaning device to the teatcup for permitting said flow through the gas conduit during the cleaning state.

17. A method according to claim 16, including the further step of delivering the cleaning fluid to the teatcup for permitting said flow to the milk-collecting member.

18. A method according to claim 17, including the further step of delivering the cleaning fluid to the teatcup for permitting said flow through the milk-transporting member to the milk-collecting member.

19. A method according to claim 13, wherein the gas conduit includes a valve arranged between the gas inlet member and the second end, the method including the further steps of:
   closing the valve during the milking state and opening the valve during at least a part of the cleaning state.

20. A method according to claim 13, wherein the cleaning device includes a cleaning nozzle to be introduced into the teatcup, and a supply unit, characterised by including the further steps of:
   supplying said cleaning fluid by means of the supply unit to a cleaning nozzle, and
   delivering said fluid into the teatcup by means of the cleaning nozzle.

* * * * *